United States Patent
Johnson et al.

(10) Patent No.: US 6,947,880 B2
(45) Date of Patent: Sep. 20, 2005

(54) METHOD FOR IMPROVING ACCURACY OF A VELOCITY MODEL

(75) Inventors: Mark J. Johnson, Cary, IL (US); Mark A. Krizik, Homer Glen, IL (US); Charles B. Swope, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/128,084

(22) Filed: Apr. 23, 2002

(65) Prior Publication Data

US 2003/0200067 A1 Oct. 23, 2003

(51) Int. Cl.⁷ .......................... G06F 17/10; G01C 21/26; G06G 7/78
(52) U.S. Cl. ............................. 703/2; 701/200; 701/300
(58) Field of Search ................................ 703/2; 701/59, 701/200–201, 207, 213, 218–220, 222–226, 300–302, 215

(56) References Cited

U.S. PATENT DOCUMENTS

| | | | |
|---|---|---|---|
| 5,153,599 A | | 10/1992 | Harigae et al. |
| 5,375,059 A | * | 12/1994 | Kyrtsos et al. ............. 701/215 |
| 5,535,237 A | | 7/1996 | LaPadula, III et al. |
| RE35,535 E | | 6/1997 | Brumley et al. |
| 5,787,384 A | * | 7/1998 | Johnson ...................... 701/216 |
| 6,480,152 B2 | * | 11/2002 | Lin et al. ............... 342/357.14 |
| 6,480,787 B2 | | 11/2002 | Yoshikawa et al. |

* cited by examiner

Primary Examiner—Kevin J. Teska
Assistant Examiner—Dwin M. Craig
(74) Attorney, Agent, or Firm—Terri S. Hughes; Barbara S. Doutre

(57) ABSTRACT

A first velocity model for a first object (190) and a second velocity model for a second object (195) are established. A spatial relationship between the first object and the second object is established. At least a portion of the first velocity model is adjusted based on at least a portion of the second velocity model and the spatial relationship of the first object to the second object.

16 Claims, 4 Drawing Sheets

METHOD FOR IMPROVING ACCURACY OF A VELOCITY MODEL

FIELD OF THE INVENTION

The present invention relates generally to inertial and other state-based navigation systems, and is especially applicable to inertial navigation systems used in proximity to each other.

BACKGROUND OF THE INVENTION

Location systems attempt to provide estimates of the velocity state of an object (velocity state estimates). An object whose velocity state is not known a priori, and whose velocity state is to be estimated by the location system, is referred to as a target object; an object whose velocity state is known, and whose velocity state is used as a reference for the estimation of other velocity states, is referred to as a reference object. The velocity state is the set of all characteristics of an object relating to its status in space and time, including such characteristics as the position, velocity, acceleration, orientation, rate of rotation, axis of rotation, direction of rotation, and any other parameters that apply to its status in space and time.

Many location systems use a "velocity model" to estimate locations of objects in the absence of direct measurement of location—for instance between measurements, or when objects are in areas not covered by the system, such as in buildings or tunnels. A velocity model is an active representation of a velocity state that may provide velocity state estimates for an object even for times when velocity state measurements (direct measurements of data relevant to the construction of a velocity state relative to reference objects with known velocity states) are unavailable. A velocity model may include estimates of some or all of the velocity state parameters, and may also include additional data such as error estimates, initialization history or change history, and identification of reference objects used in velocity state measurements. In many cases, the velocity model is simply comprised of the position, velocity, and time of the most recent velocity state measurement (or from several velocity state measurements) and the current position state of the object is estimated from the initial position and velocity based on the assumption that the object with which the velocity model is associated undergoes no acceleration during the interval between location measurements.

It is important to note that there is not a direct correspondence between parameters of a velocity state, parameters of a velocity model, parameters of a velocity state estimate, and parameters of a velocity state measurement. For example, a velocity model or velocity estimate may contain parameters representing estimated uncertainties, whereas a velocity state by definition has no uncertainty, and a velocity state measurement may have parameters which do not enable the estimation of any particular parameter of a velocity state, but which must be combined with other velocity state measurements in order to determine estimates for such parameters as position or velocity. Most velocity models, velocity state estimates, and velocity state measurements do not contain all of the parameters of a velocity state, and most contain other parameters relating to the specific implementation of the location technology.

Inertial navigation systems ("INS") provide a greatly improved method of maintaining a velocity model, by measuring acceleration on one or more axes, both linear and rotational. These acceleration measurements are used to update the estimate of parameters such as velocity and orientation in the object's velocity model. INS have long been used in missile and spacecraft guidance systems, and with the advent of micro-machining INS are finding their way into the personal (portable) devices market—devices which could be worn by people or used on small assets. Some such systems are purely inertial, measuring rotational acceleration by the force required to change the rotational axis of a gyroscope; other (usually lower cost) devices augment the purely inertial measurements with magnetic compasses, altimeters, or other devices. Devices using a six-axis gyroscope method are generally the most expensive and the most accurate.

If a target object has a velocity model (such as that maintained by an INS device) for location estimates, a reference velocity state estimate must be obtained through means other than the INS, since an INS system measures acceleration and estimates parameters such as position and velocity only as differences from an initial state. A velocity model may contain a reference velocity state estimate and an estimate of the difference between the reference velocity state estimate and the current velocity state, deriving a velocity state estimate by adding the difference to the reference velocity state estimate; alternatively, it may contain a velocity state estimate which is initialized to a reference velocity state estimate and continually maintained to represent the current velocity state estimate. Target objects that include an apparatus to assist in the determination of their velocity state estimate (target devices) may use appropriate location systems, for example the Global Positioning System ("GPS") to obtain velocity state measurements from which to derive an initial velocity state estimate. Alternatively, they may assume aspects of an initial velocity state estimate by, for example, requiring that the object remain motionless until initialization is complete and assuming an initial velocity of zero. An initial velocity state estimate may be determined from a single velocity state measurement, or it may be integrated from several velocity state measurements. Other location methods known in the art may be used to obtain an initial velocity state estimate, including simply requiring that the velocity model be initialized near a predetermined location. The initial velocity state measurement thus provides data for the initial velocity state estimate of the velocity model. The difference between the initial velocity state estimate and the current velocity state estimate is zero at the time the initial velocity state estimate is obtained. The parameters in a velocity model or velocity state measurement are generally associated with a reference frame; for instance, the GPS system uses the surface of the Earth as its reference frame, and uses the satellites as reference objects. The velocity model may be stored and maintained on a target device, or a target object may have a velocity model that is stored and maintained on a remote device. The velocity model parameters may be represented in any number of forms. For instance, values may be represented in rectilinear or polar coordinates; velocity may be represented by a vector sum or a speed and direction; linear or rotational speed may be represented as momentum or kinetic energy, with explicit or implicit values of mass or moment; and other variations too numerous to mention are available. Systems may also use techniques such as averaging or predictive filters to obtain an estimated velocity state from multiple location estimates.

The velocity model may be compromised by any number of factors. For instance, transient errors in acceleration measurement result in constant errors in the velocity estimate, which in turn result in constantly increasing errors in the position estimate. Under the best conditions, normal calibration and measurement errors will gradually accumulate over time, eventually resulting in large errors in the velocity model. Environmental stress, shock, and other conditions may introduce additional errors into the measurements, in many cases causing the velocity model error to quickly degrade to the point of uselessness.

A number of approaches to mitigating the compound error properties of the INS velocity model have been implemented. Many location devices, such as INS, that use velocity models rely under normal circumstances on velocity state measurements, reverting to velocity state estimates based on velocity models only at times when velocity state measurements are unavailable. Others use techniques such as performing periodic adjustments of their velocity models, for example by requiring a user to stop for a certain amount of time in order to reestablish their calibration to zero velocity. However, recalibration of the velocity parameter does not correct any errors in the position parameter that were accumulated while the velocity estimate was in error.

Many devices are able to track estimated error over time. Tracking estimated error over time does not improve the accuracy, but only warns a user about the potential for error in the estimate offered so that the user can behave accordingly. The error may be represented, for example, in the form of a probability distribution function or in the form of a radius representing a maximum expected error at some pre-established level of certainty.

One approach to maintaining a velocity model for a target object is to supplement it with a service providing periodic velocity state measurements. GPS is one such service, but GPS will not penetrate most buildings, and even if it does, it will not deliver the location accuracy required for useful in-building location. A local RF solution would be better for indoor conditions; such systems include those which, like GPS, derive location from the difference between the propagation delay between a target device and a first reference object and the propagation delay between the target device and a second reference object (this technique is known as time difference of arrival ("TDOA")), and those systems which derive location from the round-trip propagation delay between the target device and a single reference object (this technique is known as ranging). However, RF location systems with sufficient bandwidth to provide accurate location generally do not have sufficient power to guarantee coverage throughout the building. Using such systems improves the situation, but leaves a number of cases where devices may remain out of coverage for longer than their velocity model can be considered accurate; for instance, if asset tracking devices are stored outside system coverage, or if firefighters or law enforcement officers are involved in an extended operation outside system coverage or within buildings where coverage is unavailable.

Thus, there exists a need for a method to improve or maintain the accuracy of the velocity model of a target object without the need to bring the target object to a reference object in a known or fixed location, and which does not depend on the ability to establish RF or other links with a reference object in a known or fixed location.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

As mentioned in the background, a velocity model of a target object, even if maintained by an INS, must be updated periodically; the prior art accomplishes this by using references, which are either partially or completely known velocity states, or reference objects (objects having partially or completely known velocity states). Prior art systems may demand the user to become a reference (i.e., by standing still (known velocity) or by going to a reference position (known position)), or by obtaining information from a location system based on references. The present invention, recognizing that multiple devices with independent velocity models may be deployed in an area, proposes that these devices may negotiate a velocity model among themselves (i.e., that each device may adjust its velocity model based on all or part of the velocity model of other devices). This provides some degree of freedom from references, since a properly negotiated velocity model will be statistically more accurate than any single velocity model.

Figure 1:
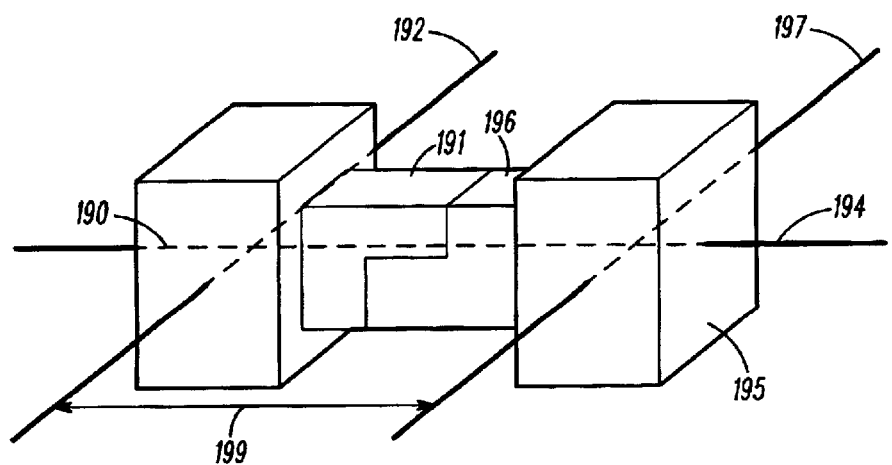
FIG. 1 illustrates a method of connecting two target devices so that their relative position, velocity, and orientation are known in accordance with the present invention.

FIG. 1 shows an example of how two devices 190, 195 may be connected so that their relative position, relative velocity, and relative orientation are known. Knowledge of the relative values (difference between the actual values) of any portion of the velocity states of two objects constitutes a spatial relationship between the two objects, whether the relative values are known precisely or are known within characterized limits. Portions of the velocity state may include parameters such as position, velocity, orientation, rate of rotation, axis of rotation, direction of rotation, or subsets of these parameters, such as the component of the velocity along the axis between the objects, spatial coordinates in only the dimensions of concern to the system design, orientation in a plane, and combinations of such subsets. The devices 190, 195 are both assumed to be target devices. The first device 190 has an asymmetrical connector 191, which mates with an identical second connector 196 attached to the second device 195. The connectors 191, 196 may include electrical, optical, or other communications elements allowing communication between the devices 190, 195. When the connectors 191, 196 are properly mated, several assumptions may be made: the positions of the devices 190, 195 may be assumed to be identical except for a position difference resulting from a known separation distance 199 along the mating axis 194 of the connectors 191, 196 (the distance 199 is small enough to be ignored in many applications); the orientations of the devices 190, 195 may be assumed to be substantially identical except for a known 180-degree rotation about the lateral axes 192, 197; and the velocities of the two devices 190, 195 may be assumed to be substantially identical when the difference in orientations is taken into account.

Figure 2:
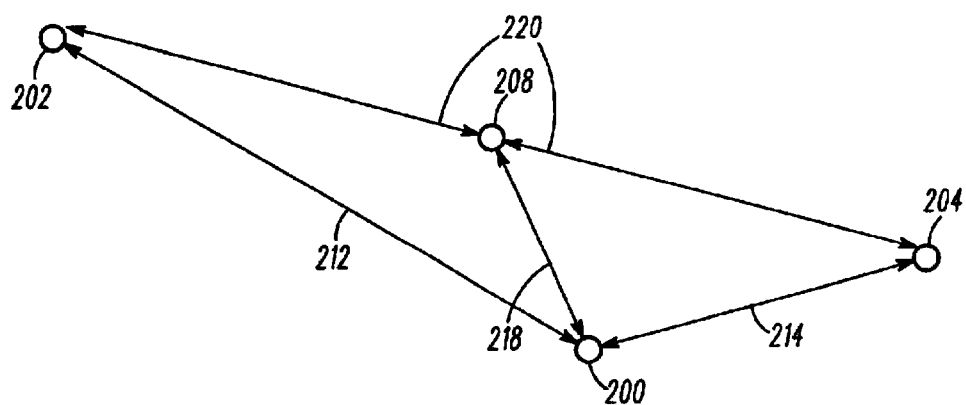
FIG. 2 illustrates the negotiation of a common position estimate between two target devices known to be in substantially the same position in accordance with the present invention.

An elementary example of the negotiation process proposed by the present invention is illustrated in FIG. 2. For simplicity, the following examples show the negotiation of location estimates in two dimensions. It will be clear to those skilled in the art that the present invention is easily extensible to higher dimensionality and is equally applicable to other velocity model parameters. The two devices 190, 195 are connected as shown in FIG. 1, and the position difference 199 is assumed to be negligible. Because the devices 190, 195 are assumed to have substantially the same position, a single position estimate 208 will be determined from the independent position estimates 202, 204 from the velocity models of the devices 190, 195, and both devices 190, 195 will replace their independent position estimates 202, 204 in their respective velocity models with the negotiated position estimate 208. It will be apparent to those skilled in the art that the method described below can easily take the position difference 199 into account if additional accuracy is required. The position parameter of the velocity model (estimated position) 202 with Cartesian coordinates (x[202], y[202]) of the device 190 is in error by a distance 212 from the position parameter of the velocity state (actual position) 200 of the device 190. The estimated position 204 with Cartesian coordinates (x[204], y[204]) of the second device 195 is in error by a distance 214 from the actual position 200 of the device 195 (which in this example is assumed to be identical to the actual position 200 of the device 190). Although the actual errors are not known, the two estimated positions 202, 204 are compared and an average position 208 with Cartesian coordinates (x[208], y[208]) is calculated which differs from the estimated position 202 by the same distance 220 that it differs from the estimated position 204. This may be done, for example, in Cartesian coordinates by calculating x[208]=(x[202]+x[204])/2 and y[208]=(y[202]+y[204])/2. The error 218 in the new position estimate 208 will, on the average, be smaller than the errors 202, 204 in the non-negotiated position estimates. It will be apparent to those skilled in the art that other velocity model parameters may be negotiated in a similar manner; for instance, assuming that the devices 190, 195 are connected as shown in FIG. 1, the orientation estimates may be negotiated taking into account the 180-degree rotation about the lateral axes 192, 197, and the velocity estimates may be negotiated similarly. Further, corrections to some velocity model parameters may be performed without directly establishing spatial relationships for those parameters; for instance, refinements to velocity or orientation estimates may be inferred by regular patterns of position errors.

Because their accuracy may change over time, many INS devices have the capability to estimate the current accuracy of their velocity model data. The estimated accuracy, sometimes called the confidence level, is usually in the form of a probability distribution function, and may be represented in a number of ways, including, but not limited to: values representing parameters of a probability distribution function, such as standard deviation; sets of functions used to construct a probability distribution function; lists of values of the probability distribution function at various coordinates; or values representing a maximum error that will be greater than or equal to the actual error to a predetermined degree of confidence (error radius). In the error radius case, the probability distribution function of the actual position error is approximated as a flat probability distribution over the circle (in two-dimensional systems) or the sphere (in three-dimensional systems) defined by the error radius value, and zero at any location outside the circle or sphere.

In the interest of simplicity, the preferred embodiment of the present invention will focus on the error radius method of representing the estimated accuracy of the velocity model. It will be appreciated by those skilled in the art that other forms of accuracy representation will be amenable to other methods without diverging from the intent of the present invention. Further, the discussion will focus on the calculation of position estimates and error estimates associated with position estimates in two dimensions. It will be apparent to those skilled in the art that the same techniques may be applied to velocity, orientation, rate of rotation, axis of rotation, direction of rotation, and other velocity model parameters and error estimates, and that they may be easily extended to three dimensions.

Figure 3:
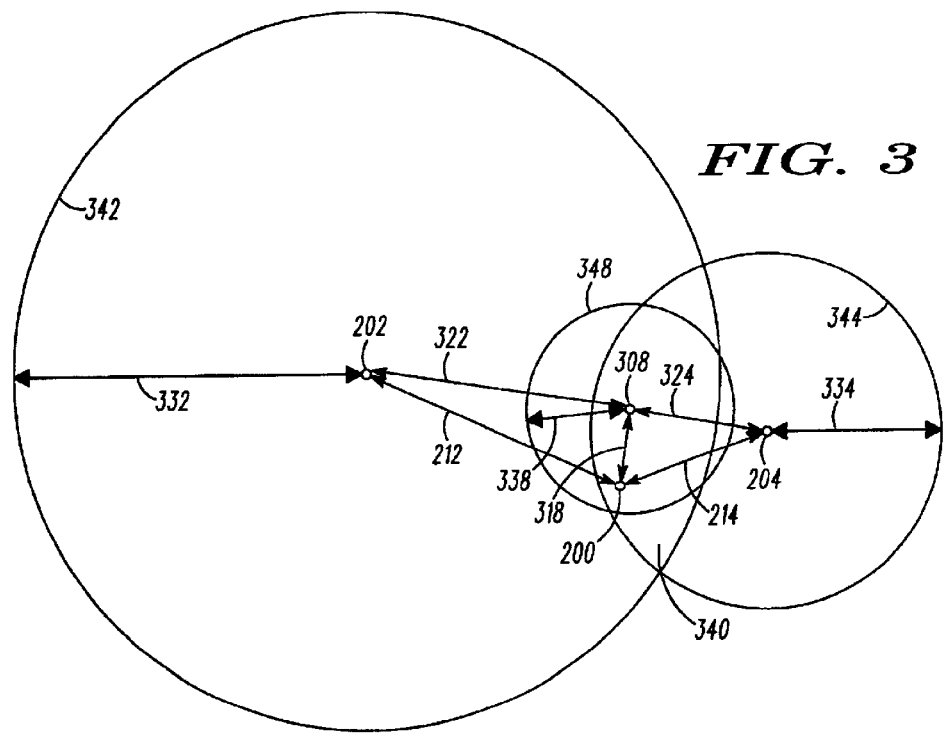
FIG. 3 illustrates the negotiation of a weighted position estimate between two target devices known to be in substantially the same position, whose position estimates have different levels of accuracy, in accordance with the present invention.

FIG. 3 illustrates how the accuracy estimates may be used to improve the results of the negotiation. As before, the two devices 190, 195 are connected as shown in FIG. 1, and the position difference 199 is assumed to be negligible. Because the devices 190, 195 are assumed to have substantially the same position, a single position estimate 308 will be determined from the independent position estimates 202, 204 from the velocity models of the devices 190, 195, and both devices 190, 195 will replace their independent position estimates 202, 204 in their respective velocity models with the negotiated position estimate 308. The velocity model of the first device 190 includes an estimated position 202, which is in error by a distance 212 from the actual position 200. The velocity model of the second device 195 includes an estimated position 204, which is in error by a distance 214 from the actual position 200.

In addition, each device 190, 195 reports an estimate of the potential error in the position estimate (position error estimate) in the form of an error radius, which can be used to construct an error circle in two dimensions. The device 190 reports a position error estimate represented by the error radius 332 with a value of r[332], and its actual position 200 is assumed to be within the circle 342 representing all points within the error radius 332 of the estimated position 202. Similarly, the device 195 reports a position error estimate represented by the error radius 334 with a value of r[334], and its actual position 200 is assumed to be within the circle 344 representing all points within the error radius 334 of the estimated position 204. The smaller error radius 334 represents a higher confidence level than the larger error radius 332. If one assumes that the actual location of each device 190, 195 is within the error radius 332, 334 of its estimated position 202, 204, then the area 340 of overlap between the error circles 342, 344 represents the locus of possible locations of the devices 190, 195. This expectation is fulfilled in this example, as the actual position 200 of the devices 190, 195 is in fact within the area 340 of overlap between the error circles 342, 344.

Since the error radius 334 has a value half that of the error radius 332, the preferred embodiment of the present invention gives the position estimate 204 of the device 195 twice as much weight in the negotiation process as the position estimate 202 of the device 190. This may be done, for example, in Cartesian coordinates by calculating x[308]=(x[202]r[334]+x[204]r[332])/(r[334]+r[332]) and y[308]=(y[202]r[334]+y[204]r[332])/(r[334]+r[332]). The result is that the negotiated position estimate 308 is twice as far from the position estimate 202 of the device 190 as it is from the position estimate 204 of the device 195, giving a resulting position error 318 between the negotiated position estimate 308 and the actual position 200 of the devices 190, 195. Other methods of using error radii to improve the location estimate include determining the geometric center of the area 340, maximizing the weighted or un-weighted product of the distances from the negotiated position estimate 308 to the error circles 342, 344, minimizing a mean-squared weighted error function, or simply choosing the position estimate associated with the lowest reported error radius. If non-rectangular probability distribution functions are used to represent the estimated error, statistical methods, such as choosing a negotiated position estimate 308 to maximize the product of the values of the probability distribution functions associated with the estimated positions 202, 204 at the negotiated position estimate 308, may be employed. All such methods are implementation details within the scope of the present invention.

The area 340 may represent the estimated error of the negotiated position estimate 308, or the error radius 338 that indicates that the devices 190, 195 are within the circle 348 may approximate it. The calculation of the error radius 338 would be dependent on the accuracy and reliability requirements of the system;

the error radius 338 could be large enough to include the entire area 340 to ensure the same level of reliability used to calculate the error radii 332, 334, or it may be smaller based on statistical methods of estimating compound probability. Other methods of representing estimated errors will have similar options.

Using weighting in the negotiation of a common location solution is particularly useful in cases where the accuracy estimate of one device is significantly better than that of another, such as when the velocity model of one of the devices has been compromised by malfunction or mechanical stress, or when the velocity model of one device is much older than the other, and thus has significantly greater accumulated error. The present invention thus allows updating of devices 190, 195 in the field, either by dispatching a courier with a fresh velocity model or by sharing among deployed devices. The method described above allows the process to be automated to the point where physically establishing a connection is the only manual intervention needed. Although the above description describes an operation involving two devices, it will be obvious to those skilled in the art that the techniques are easily extended to allow negotiation of velocity model parameters among any number of devices, either simultaneously or sequentially.

The above examples use a physical connection to establish a precise physical relationship between devices 190, 195 involved in a negotiation, so that known differences in such properties as position, orientation, and velocity may be taken into account in the negotiation process. In many applications, however, it may be impractical to physically connect such devices on a regular basis. The present invention is easily adapted to connections not requiring mechanical contact, as illustrated in FIG. 4.

Figure 4:
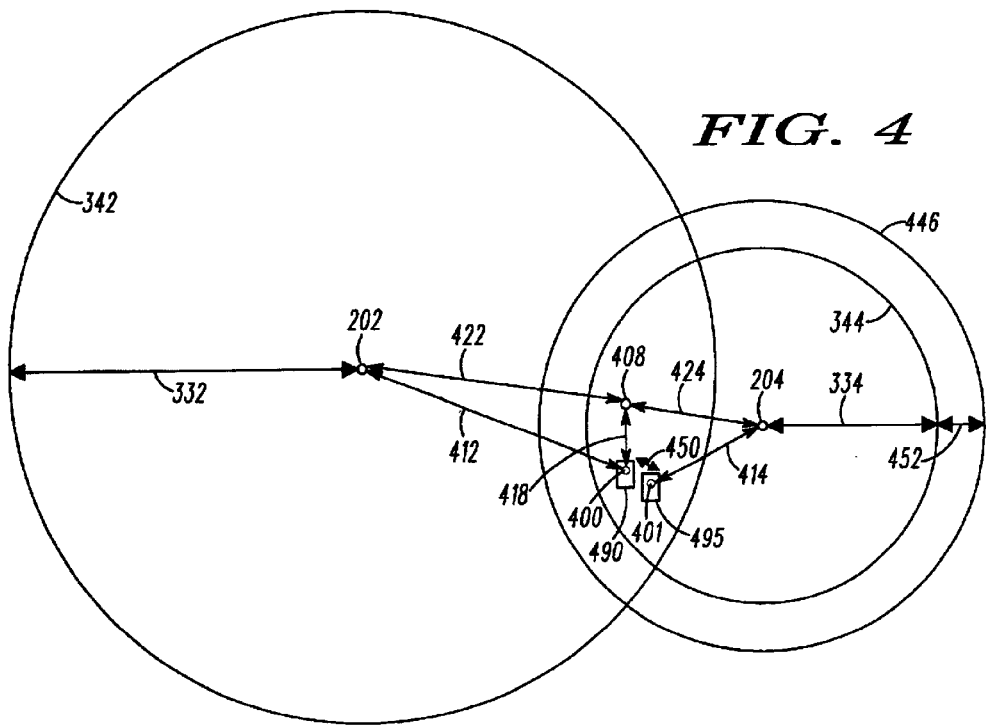
FIG. 4 illustrates a method of adjusting a velocity model of a first device based on the velocity model of a second device and a known maximum distance between the first and second devices without a direct physical connection in accordance with the present invention.

FIG. 4 shows two target devices 490, 495 at positions 400, 401 respectively. The distance between the positions 400, 401 is known to be less than a maximum distance 452. For example, the devices 490, 495 may be communicating over a wireless link 450 with a maximum range 452. This introduces uncertainty into the relative position equivalent to the range 452 of the wireless link 450; while the devices 190, 195 knew their relative positions within the relatively small tolerances of the mechanical connectors 191, 196, the wireless devices 490, 495 only know that their position differences are less than the range 452 of the wireless link 450; it is assumed that if the position differences of devices 490, 495 were greater than the range 452 of the wireless link 450, no communication would take place between them over the link 450. Because the devices 490, 495 are not assumed to have substantially the same position, the calculation of the negotiated position estimate 408 of the device 490 will be slightly different than the calculation of a similar negotiated position estimate of the device 495, with no expectation that the results will be identical.

The velocity model of the first device 490 includes an estimated position 202, which is in error by a distance 412 from the actual position 400. The velocity model of the second device 495 includes an estimated position 204, which is in error by a distance 414 from the actual position 401.

For simplicity, the calculation of the negotiated velocity model 408 of the device 490 will be described; the calculation of the negotiated velocity model for the device 495 will be similar, but with the roles reversed. Because the uncertainty is an effect of the wireless link 450, each device 490, 495 applies that uncertainty only to the location of the other. The device 490 does not apply any compensation to its own position estimate 202 or error radius 332 but, due to its uncertainty of the precise location of the device 495, it must allow for the possibility that the velocity model data reported by the device 495 (including the estimated position 204) does not represent an estimate of the same velocity state. The preferred method of accounting for this uncertainty in the preferred embodiment is to add the error radius 334 reported by the device 495 to the maximum range 452 of the wireless link 450 to construct an error circle 446 representing the locus of points wherein the device 490 may be according to the information available from the velocity model of the device 495 and the uncertainty of the device 490 about the actual position of the device 495 relative to the device 490.

Using the error radius notation, this is simply an expansion of the error circle to accommodate the uncertainty in the relative location. If more sophisticated data regarding the probability distribution function of the location estimate 204 or the range of the link 452 are available, these may be combined into an aggregate probability distribution function using multidimensional convolution over the two functions or other mathematical techniques well known in the art. In general, the probability distribution function of the uncertainty given the successful establishment of the wireless link 450 will be relatively flat for distances within the designed coverage range 452 of the link 450.

The calculation proceeds in a manner similar to that described above in the discussion of FIG. 3, except that the relative weighting of the position estimate 204 of the device 495 is determined not by the error radius 334 of the device 495, but by the sum of (1) the error radius 334, and (2) the range 452 of the wireless link 450. This incorporates the additional uncertainty of the difference in the actual positions 400, 401 of the devices 490, 495 into the negotiated position estimate 408 of the device 490 as an additional source of error. Thus, the ratio of the distance 422 to the distance 424, instead of being equal to the ratio of the error radius 332 to the error radius 334, is equal to the ratio of the error radius 332 to the sum of the error radius 334 and the range 452 of the wireless link 450. The result is the negotiated position estimate 408, which differs from the actual position 400 of the device 490 by an error 418.

Estimation of the new position error estimate for the position estimate 408 may now proceed as described previously in the discussion of FIG. 3, except that again the error circle 446 with a radius equal to the sum of the error radius 334 and the range 452 of the wireless link 450 is used to represent the confidence level of the position estimate 204 to the device 490.

If the velocity model of the device 495 is adjusted based on the velocity model of the device 490, the error radius 334 will be used directly and the range 452 of the wireless link 450 will be added similarly to the error radius 332 reported by the device 490. As a result, the negotiated position 408 of the device 490 will differ from the negotiated position of the device 495 to an extent that will, on the average, represent the actual distance between the devices.

The wireless link described above does not directly indicate the relative velocity or orientation of the devices 490, 495; however, methods of deriving this information are well known in the art. For instance, directional or electrically steered antennas on both devices 490, 495 would provide sufficient information to establish relative orientation on a direct-path link, and frequency shift (Doppler) information could indicate relative velocity on the axis between the two devices. Further, successive position negotiation between two devices, or between one device and a series of other devices, can serve to provide negotiable orientation and velocity information in the long term, in a manner analogous to the updating of such velocity model information in the current art based on a series of readings from a reference-based location system, readings from different references, or successive readings from a single moving reference.

The above description shows by way of example that the locations 400, 401 of the devices 490, 495 are within a certain range 452 based on the maximum operating range of a wireless link 450. However, any method of estimating a maximum distance 452 between the locations 400, 401 will serve for the purpose of the present invention. For instance, if the devices are assigned to a group of users known to stay together within a certain maximum range, a longer-range or centralized communication system could be used to convey the velocity model parameters between the devices, or if processing power on the individual devices is a concern, a central server could perform the negotiation calculations described above on behalf of the devices, sending only the resulting updates to the velocity models or maintaining the velocity models in a centralized location. One or both users could also establish proximity manually by connecting the devices with a wire of a known length, entering an identification of a nearby device on a keypad, by assumption of compliance to scheduled meetings, or by correlation of movement wherein a server may reasonably assume that devices simultaneously moving in substantially similar patterns represent members of a group moving together. These and any other means of determining or approximating proximity will provide the range 452 required for the implementation of the present invention. This is particularly useful in the restoration of velocity models that have been catastrophically compromised due to shock, electrical interruption, or other effects, as they may be restored quickly from other devices in the group, even including the previously established differences from the velocity models of the other devices. If known relationships between other velocity model parameters exist (for instance, if two devices are known to be traveling in the same vehicle) these relationships may be used similarly.

Further, it is not necessary for the present invention that the devices 490, 495 are not necessarily INS-equipped devices, and may not even exist within the maximum range 452 at the same time. It is clear that the device 495 may be a device that had been deployed earlier in a fixed, but unknown, location; such a device may have a more stable velocity model after deployment, as the lack of any acceleration could be used in many circumstances as an indication that the device is motionless, and that its velocity may be assumed to be zero. The device 495 would then be considered a landmark, which is defined as a target object with a velocity model associated with it that can by some means be uniquely identified within the error radius of another target object (in this case, a unique ID); it would be further considered a beacon, which is a landmark with means (in this case RF) to actively advertise its presence. A landmark is not a reference object because the velocity state of a reference object is known, so a reference object has no need for a velocity model. However, in accordance with the present invention, if the device 495 was deployed such that its velocity is known to be zero, the device 495 would not have need for an INS. Instead, it could inherit its position estimate and position error estimate from a third device present at the time of deployment, and incorporate these into its own velocity model along with a velocity parameter with a value of zero. With an RF link and a valid velocity model, the beacon 495 may proceed with velocity model negotiations as described in the discussion of FIG. 4, and may optionally refine its own position estimate and position error estimate accordingly.

Although all of the above discussions are, for the sake of illustration, framed in terms of the target objects 190, 195, 490, 495 communicating and negotiating their velocity models with each other, it will be clear to those skilled in the art that, even though a velocity model is associated with an object, it is not necessary for the object to have awareness or even be capable of having awareness of the velocity model. Instead, a separate device may establish and maintain the velocity model on behalf of the object. This allows for a further simplification of the beacon 495 described in the previous paragraph, and its velocity model could be stored on a remote device. When the device 490 detects the presence of the beacon 495, therefore, the device 490 would establish communication with the remote device maintaining the velocity model of the beacon 495, and the remote device would perform the velocity model negotiations on behalf of the beacon 495.

The beacon 495 described in the preceding paragraph does not maintain its own velocity model, nor does it communicate velocity model information; the remote device maintains and communicates the velocity model on behalf of the beacon 495. The beacon 495 simply provides an indication that a target device is within a known proximity of a target object with a velocity model. If another means of establishing proximity is available, the beacon 495 may be dispensed within favor of a passive landmark, which does not itself participate in the location process. A simple example of this would be a checkpoint, where personnel carrying target devices (users) report their arrival. A commander receiving these reports would be able to manually enter the identification of a target device carried by that user. The first time a user, with (for example) a target device 495, reports being at the checkpoint, a velocity model is established for the checkpoint, making it a landmark. This velocity model is initialized with the parameters of the target device 495, with appropriate modifications (for instance, fixing the velocity estimate at zero if the checkpoint is known to be stationary). When another user, with (for example) a target device 490, is reported as being at the checkpoint, the device 490 may negotiate its velocity model with the velocity model of the checkpoint as described in the discussion of FIG. 4, even though the checkpoint is simply a target object with no location capability whatsoever. In certain cases, it may even be desirable to update the velocity model of the device 495 based on this negotiation; for example, if the error radius of the checkpoint becomes significantly smaller than the error radius of the device 495 within a relatively short time after the device 495 encounters the checkpoint.

This method may be further automated using other means of establishing proximity between two reference objects (one or both of which may be devices). For example, a corollary use of portable INS devices is inertial fingerprinting, which is the identification of certain environmental objects (e.g., revolving doors, hallway comers or intersections, and stairs) that restrict movement in specific ways. The pattern of acceleration measurements over time of, for example, a human walking up a flight of stairs can be uniquely identified to a high degree of confidence; such a pattern of acceleration measurements is variously referred to as an acceleration profile, inertial signature, or inertial fingerprint. If a human carrying a target device with an INS traverses a stairway, the identification of the inertial fingerprint of a stairway may be easily recognized. The stairway is then assigned a velocity model in the same way as the checkpoint in the previous paragraph was assigned a velocity model, making it a landmark. Thereafter, any human carrying a target device whose INS indicates the inertial fingerprint of a stairway, and whose velocity model reports an error circle intersects with the error circle of that stairway and no other stairway, may be assumed to be traversing the characterized stairway. As such, negotiation between the velocity model of the second user's target device and the velocity model of the stairway may be performed.

It will be clear to those skilled in the art that the checkpoint method and the inertial fingerprint methods described in the preceding paragraphs represent only two of a wide variety of methods known in the art for identifying objects. Other examples include optical, infrared, and RF imaging technologies, electromagnetic profiles and signatures, acoustic sounding, and passive tagging (e.g., with bar codes), to name only a few. Any method of identifying an object that can become a target object will serve to enable the present invention.

Although objects referred to as landmarks and beacons have been used in the prior art, they have always been reference objects with known locations. The present invention enables the ad-hoc establishment and subsequent use of landmarks as target objects whose positions are not known a priori. This improvement is critical in markets such as fire services, law enforcement operations, and military operations, where the characterization of an incident scene prior to the need for location capability is often impractical. The above represent only a sample of possible techniques for establishing landmarks, but regardless of the technique chosen to establish a landmark, the process of negotiating the velocity models will take place in accordance with the present invention.

As in the method described in FIG. 3, it is clear that, within the scope of the present invention, any number of devices may participate in a negotiation. Further, some additional location may be gleaned from the nature of such negotiations; for instance, if a first device establishes wireless links with a second device and a third device, and the second and third devices are incapable of establishing a link, it can be reasonably assumed that the second and third devices are farther apart than the range of the link, and that they are separated by more than 60 degrees in a polar coordinate system originating at the first device.

It is clear that the range 452 of the wireless link 450 is a critical parameter in a system that establishes proximity on the basis of the range 452. If the range 452 approaches the required accuracy of the system, negotiations will provide little benefit beyond restoring severely compromised velocity models. If the range 452 is too short, few opportunities for negotiations will occur. Careful selection of this parameter is the key to optimizing the system.

Any refinement of the spatial relationship between target objects will result in the improvement of the performance of a system, including the present invention. For instance, if a direct wireless link is used to establish proximity between target devices, it may also be capable of supporting ranging or other location technologies. There are several forms of ranging available. By measuring the strength of a signal, and knowing the transmitted power and gain, one can estimate the distance traveled. Similarly, by searching for the minimum transmitted power with which a link can be established, one can estimate the distance over which the signal must travel. Both of these approaches require an unobstructed direct path between the two devices and predictable radiation levels and patterns to achieve a useful level of accuracy. Another form of ranging measures the time required for a first signal to propagate from a first node to a second node plus the time required for a second signal to propagate from the second node to the first node. This method requires stringent timing and large signal bandwidth for electromagnetic signals; the timing and bandwidth requirements for slower acoustic signals are less demanding, but more severe multipath and noise issues are significant.

Although any location technology can add value, ranging will be used for the description of the preferred embodiment.

Figure 5:
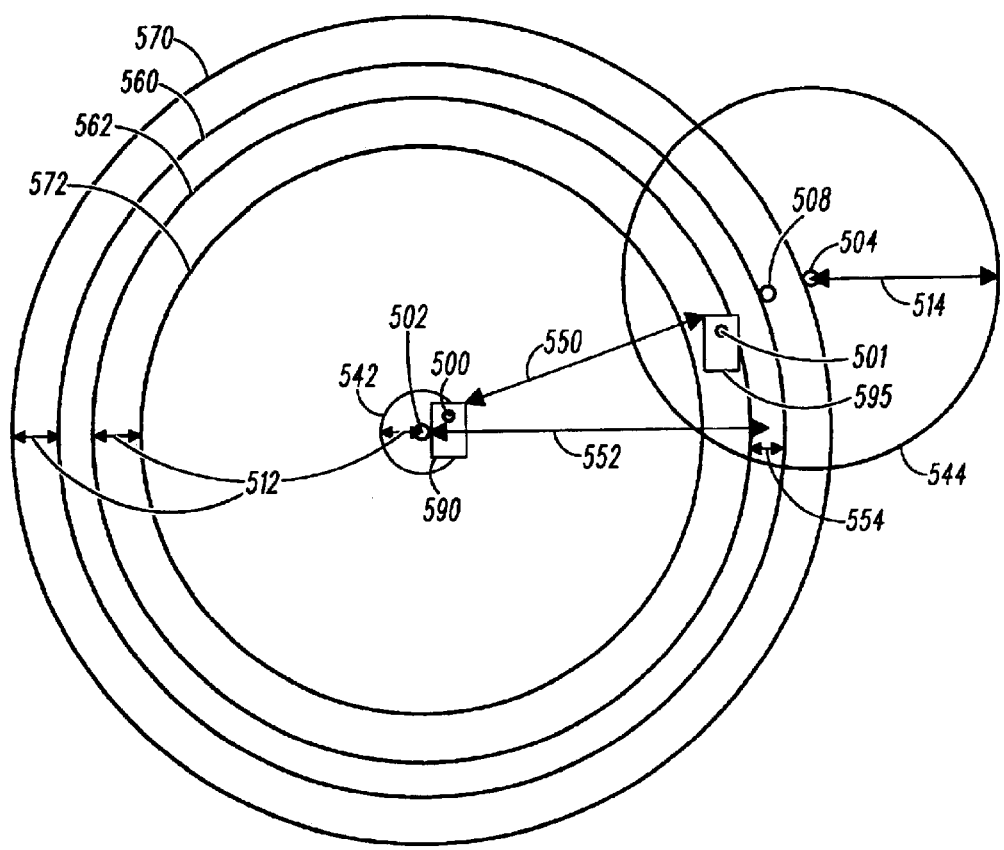
FIG. 5 illustrates a method of adjusting a velocity model of a first device based on the velocity model of a second device and a known maximum and minimum distance between the first and second devices without a direct physical connection in accordance with the present invention.

FIG. 5 illustrates a negotiation between two target devices 590, 595 at locations 500, 501 respectively, using a wireless link 550 with ranging capability. Device 590 reports a position estimate 502 with an error radius 512 that defines a circle 542 containing all possible positions of device 590. Device 595 reports a position estimate 504 with an error radius 514 that defines a circle 544 containing all possible positions of device 595. In a manner similar to the discussion of FIG. 4, the derivation of the negotiated position 508 of the device 595 will be described, with the understanding that the derivation of the negotiated position of the device 590 will follow a congruent process.

The ranging capability of the devices 590, 595 indicates a distance 552 between the devices 590, 595 with an uncertainty 554. If the estimate 502 of the position 500 of device 590 were correct, the distance estimate 552 between the device 590 and the device 595 and the uncertainty 554 of the distance estimate 552 would imply that the device 595 lies within the circle 560, but outside the circle 562. The error radius 512 of the position estimate 502 may be taken into account by subtracting the error radius 512 from the radius of the circle 562 to establish the inner limiting circle 572, and adding the error radius 512 to the radius of the circle 560 to establish the outer limiting circle 570.

It may thus be determined that, based on the velocity model of the device 590 and the ranging information 552, 554 established on the wireless link 550, that the actual location 501 of the device 595 is outside the inner limiting circle 572, and inside the outer limiting circle 570. Combined with the position estimate 504 and error radius 514 of the device 595, it may be determined that the actual position 501 of the device 595 is in the area enclosed by both the error circle 544 and the outer limiting circle 570, but not by the inner limiting circle 572. The negotiated position estimate 508 and associated accuracy estimate may be determined by any number of mathematical techniques, including those described above in the discussions of FIG. 3 and FIG. 4.

Figure 6:
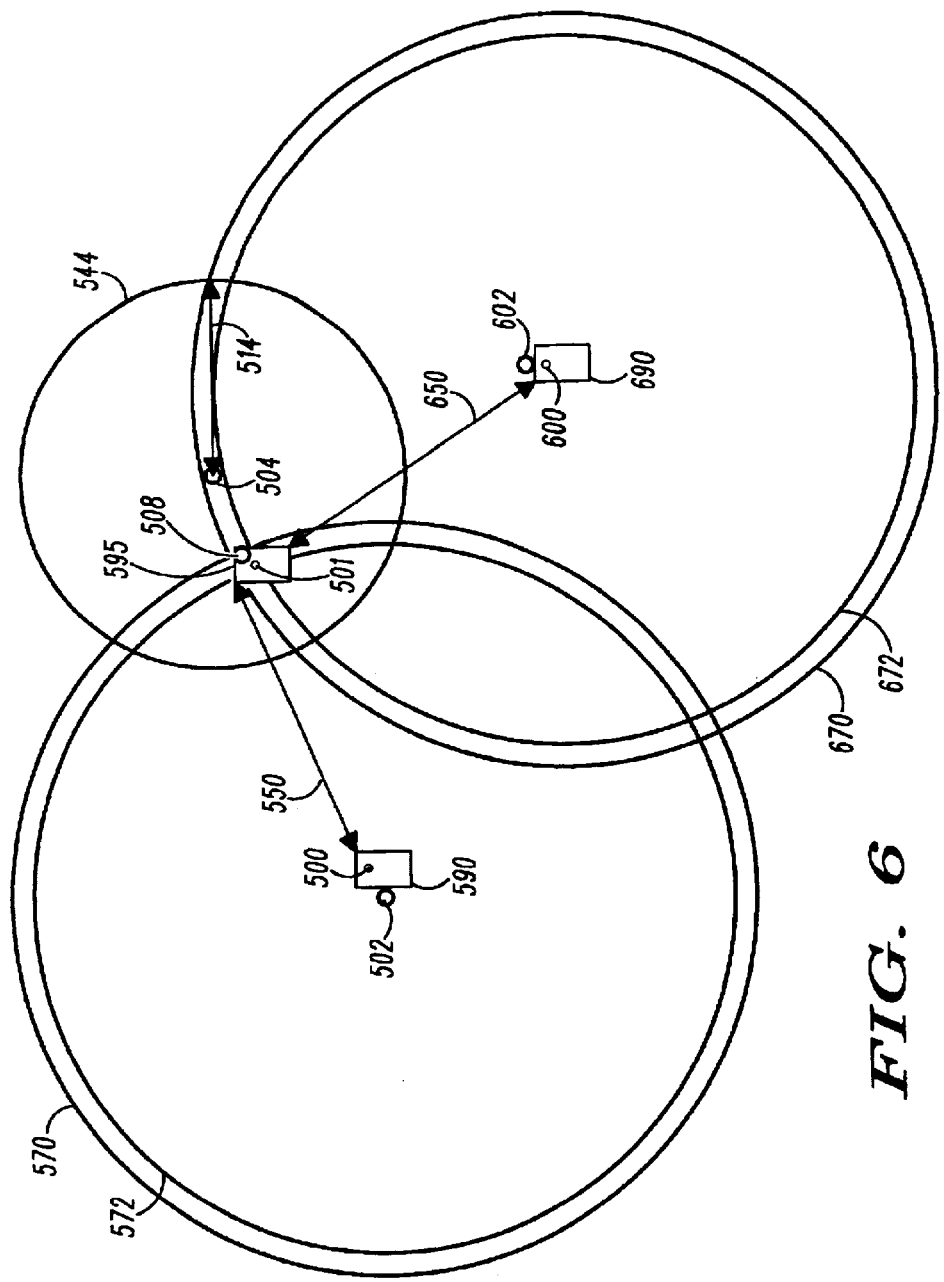
FIG. 6 illustrates a method of adjusting a velocity model of a first device based on the velocity models of two other devices, each of which have a known maximum and minimum distances from the first device in accordance with the present invention.

Referring now to FIG. 6, the utility of the combination of ranging and velocity model negotiation is shown to be enhanced by multiple readings. As above, the target device 595 at position 501 has an estimated position 504 and an error circle 544. As above, communication with target device 590 at location 500, with position estimate 502, over wireless link 550 shows the location of the target device 595 to be outside the circle 572 but inside the circle 570. Further, communication with the target device 690 at location 600, with position estimate 602, over wireless link 650 shows the location of the target device 595 to be outside the circle 672 but inside the circle 670. This limits the possible positions of the device 595 to be the area outside the circles 572, 672 but inside the circles 544, 570, 670. A compromise position, taking into account the estimates and weights offered by each of the participating devices 590, 595, and 690, and falling within the area outside the circles 572 and 672, but inside the circles 544, 570, and 670, is established as the negotiated position estimate 508.

Although the above examples illustrated the invention by assuming the absence of reference devices from which location data could be derived, it will be appreciated by those skilled in the art that the combination of the present invention with prior art techniques wherein at least one reference device participates in the negotiation will provide an improvement over either technique alone. The algorithms will be similar to those described above, except that the reference devices will have no uncertainty in their position (i.e., the error circle of a reference device will have a radius of zero, or its probability distribution function will have a standard deviation of zero), and the reference devices will have known velocity states instead of velocity models (although the parameters of the known velocity states may be represented as velocity model parameters).

While the invention has been described in conjunction with specific embodiments thereof, additional advantages and modifications will readily occur to those skilled in the art of location systems. The invention, in its broader aspects, is therefore not limited to the specific details, representative apparatus, and illustrative examples shown and described. Various alterations, modifications and variations will be apparent to those skilled in the art of location systems in light of the foregoing description. These may include, but are certainly not limited to, application of the present invention to other implementations of location systems, use of other techniques for modeling confidence and error estimates, operation in more than two dimensions, as well as combination of the present invention with other location techniques such as angle-of-arrival, signal strength, hyperbolic and elliptical techniques, and hybrid systems using such devices as compasses and barometers to augment inertial or other measurements. Thus, it should be understood that the invention is not limited by the foregoing description, but embraces all such alterations, modifications and variations in accordance with the spirit and scope of the appended claims.

We claim:

1. A method for improving accuracy of a velocity model in an inertial navigation system, comprising the steps of:
    establishing a first velocity model for a first object with a first position estimate;
    establishing a second velocity model for a second object with a second position estimate;
    establishing a spatial relationship between the first object and the second object based on a single position estimate determined from the first and second position estimates; and
    adjusting at least a portion of the first velocity model based on at least a portion of the second velocity model and the spatial relationship of the first object to the second object.

2. The method of claim 1 wherein at least one of the first and second velocity models is derived from a first reference velocity state estimate and a first estimated difference between the first reference velocity state estimate and a current velocity state estimate of the first object.

3. The method of claim 1 wherein at least one of the first and second velocity models is derived from a third velocity model.

4. The method of claim 1 wherein at least one of the first and second velocity models is derived from the other.

5. The method of claim 1 wherein the spatial relationship includes one of the following: an estimated maximum distance between the first object and the second object, an estimated minimum distance between the first object and the second object, an estimated relative velocity between the first object and the second object, an estimated relative orientation between the first object and the second object, and an estimated distance between the first object and the second object.

6. The method of claim 1 wherein the first velocity model and the second velocity model share a reference frame.

7. The method of claim 1 wherein the spatial relationship includes at least one of the following: relative position, velocity, orientation, rate of rotation, axis of rotation, and direction of rotation.

8. The method of claim 1 wherein at least one of the first and second objects is selected from a group consisting of: a target device, a landmark, and a beacon.

9. The method of claim 1 further comprising the step of allowing one of the first or second velocity models to have a larger effect on the adjustment of the first velocity model than the other.

10. The method of claim 1 further comprising the step of estimating at least one confidence level for at least one parameter of the adjusted first velocity model based on at least one confidence level estimate in at least one of the first and second velocity models.

11. The method of claim 1 wherein at least one of the first or second velocity models is stored on the target object with which it is associated.

12. The method of claim 1 wherein at least one of the first or second velocity models is stored in a place other than on the target object with which it is associated.

13. The method of claim 1 wherein the velocity model is used in a location system.

14. The method of claim 1 wherein at least one velocity model is used by a plurality of objects based on the spatial relationship of the target objects and at least one of the first and second velocity models.

15. The method of claim 1 wherein the spatial relationship consists of proximity only.

16. The method of claim 1 wherein a confidence level is established for at least one of the spatial relationship of the first and second objects.

* * * * *